Figure 1:
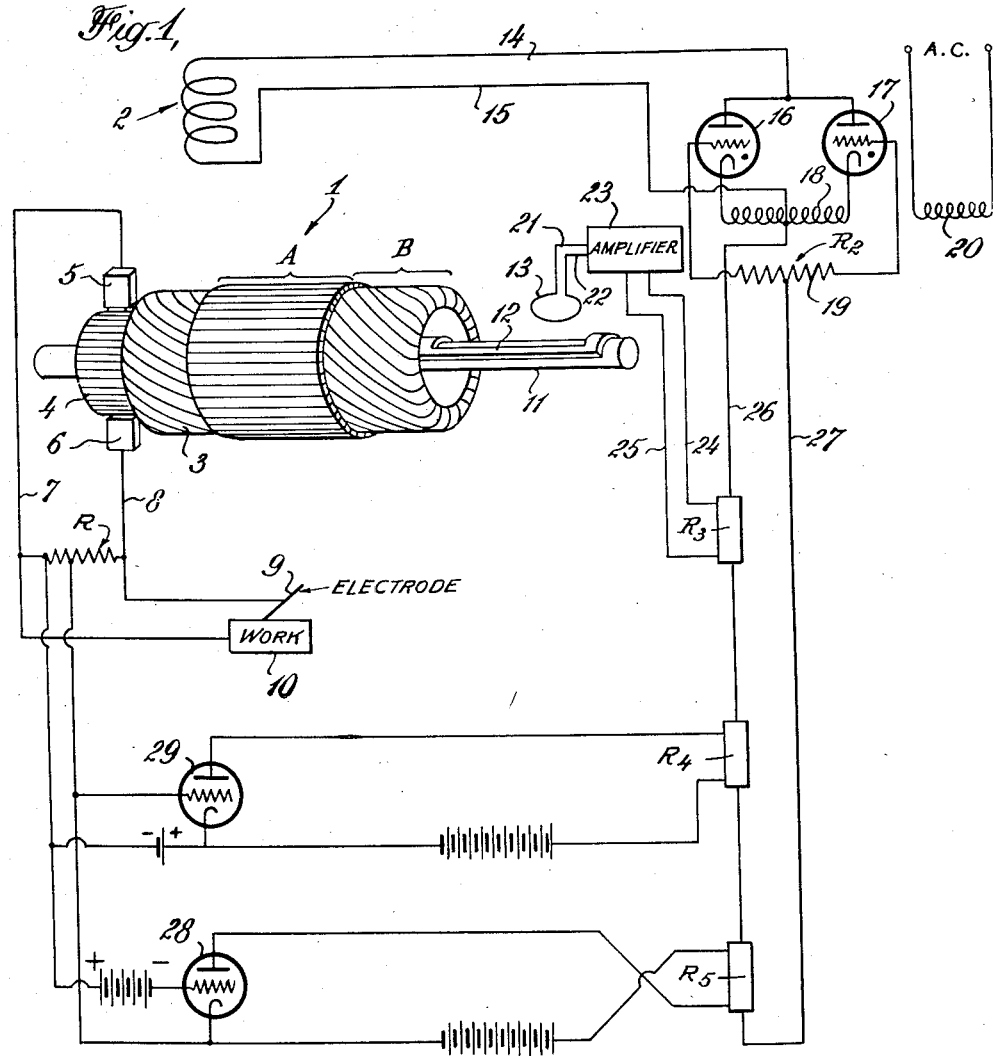

Dec. 5, 1950  J. M. TYRNER  2,533,069
ELECTRIC ARC WELDING
Filed April 30, 1946

INVENTOR
Joseph M. Tyrner
BY
ATTORNEY

Patented Dec. 5, 1950

2,533,069

UNITED STATES PATENT OFFICE 2,533,069

ELECTRIC ARC WELDING

Joseph M. Tyrner, New York, N. Y., assignor to Air Reduction Company, Incorporated, a corporation of New York Application April 30, 1946, Serial No. 665,926

7 Claims. (Cl. 322—17)

This invention relates to electric welding generators, and more specifically, to welding apparatus having a voltage current characteristic such that throughout the normal range of welding voltage, the welding current is maintained substantially constant. In this type of welding apparatus, it is desirable to have a drooping voltage current characteristic for arc voltages above and below the normal range of welding voltage so that the welding current becomes zero at a safe open circuit voltage and so that the short circuit current is limited to a reasonable value.

In direct current welding generators embodying my invention, the value of the current supplied by the generator armature is determined by the amount of field excitation and the principal object of this invention is to provide improved means for regulating the supply of current to the generator field winding to produce the voltage current characteristic described above. In general, I prefer to employ electronic means for supplying excitation current to the generator field winding and this invention contemplates the use of means responsive to the internal electrical condition of the generator armature winding for controlling or regulating the supply of excitation current to the field winding of the generator.

A typical embodiment of my invention comprises a direct current welding generator having a field winding and a main armature winding. The main armature winding has its end connections connected to commutator segments in the usual manner, the commutator being located at one end of the armature in accordance with the usual practice and the usual commutator brushes are employed for the purpose of supplying direct current to the welding circuit. The field structure of the generator is such that the magnetic field produced by the generator field winding traverses a portion of the main armature winding, the remaining portion of the armature winding being disposed in a region not traversed by any substantial portion of the magnetic field produced by the generator field winding. Thus the generator field structure may be such that the field winding on the field poles is disposed near one end of the armature, preferably, but not necessarily, near the end of the armature adjacent the commutator. When the generator is in operation, the current flowing in the armature winding produces a magnetic field, commonly referred to as the armature reaction flux, and in my improved generator, this armature reaction flux in the region of the armature winding not traversed by the main field winding, is proportional to the current flowing in the armature circuit and is not appreciably distorted or affected in any way by the magnetic field produced by the field winding of the generator. According to my invention, this armature reaction flux is utilized for the purpose of generating an E. M. F. in a single loop auxiliary armature winding or coil mounted on the armature in inductive relation with that portion of the main armature winding which is not traversed by any substantial portion of the magnetic field produced by the generator field winding.

The current induced in the auxiliary armature winding under the conditions I have just described is a single phase alternating current which produces a corresponding pulsating magnetic field. This pulsating magnetic field may be regarded as having two components rotating in opposite directions and because the auxiliary armature winding is carried by and rotates with the generator armature, one of these field components remains stationary with respect to the generator field structure and the other component rotates with respect to this field structure at a speed equal to twice the speed of the armature. A typical embodiment of my invention includes a coil, or winding mounted in inductive relation to the auxiliary armature winding, this coil being preferably stationary with respect to the generator field structure so that it is traversed by the rotating component of the magnetic field produced by the current induced in the auxiliary armature winding. This coil mounted in inductive relation to the auxiliary armature winding may be characterized as a control coil and it will be understood that the current induced in this coil is proportional to the current induced in the auxiliary armature winding which is in turn proportional to the armature reaction flux of the generator. The current induced in the control coil is used for the purpose of controlling the supply of excitation current to the generator field winding preferably by controlling the grid circuit of a thyratron rectifier which supplies unidirectional current to the generator field winding.

Throughout the normal range of welding voltage, the supply of excitation current to the generator field winding may be controlled entirely by the current induced in the control coil as described above, the arrangement being such that any slight increase in welding current produces a corresponding increase in the value of the current induced in the control coil with the result that the supply of excitation current to the generator field winding is immediately reduced to such an extent that the current in the welding circuit is reduced to the desired value. I prefer to employ means responsive to the welding circuit voltage for modifying the action of the control coil whenever the welding voltage is above or below the normal range whereby a drooping voltage current characteristic is provided whenever the welding voltage exceeds or is less than the normal range of welding voltage.

By making an appropriate adjustment in the control coil circuit, the load of the generator may be changed as desired.

Figure 2:
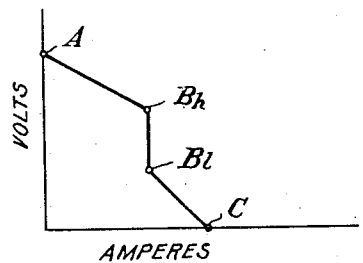

In Fig. 1 of the accompanying drawings, I have shown in diagrammatic form an illustrative embodiment of my improved welding apparatus and in Fig. 2 I have illustrated a typical voltage current characteristic curve for apparatus embodying this invention.

The welding generator illustrated diagrammatically in the accompanying drawing comprises an armature 1 and a field winding 2. The armature winding has end connections 3 connected to segments of a commutator 4 engaged by brushes 5 and 6 which may be connected through suitable leads 7 and 8 to a welding electrode 9 and to the work 10. The welding circuit for this direct current welding apparatus thus comprises the electrode 9, the work 10 and the leads 7 and 8, the circuit being completed through the generator brushes 5 and 6, the commutator 4 and the main armature winding of the generator.

The magnetic circuit of the generator field structure is not illustrated but it will be understood from the location of the diagrammatically illustrated field winding 2 with respect to the armature that the magnetic field produced by the field winding traverses only that portion of the armature winding located in the iron core of the armature, shown at A. The remaining portion of the armature winding, designated B, is displaced from the axis of the field winding to such an extent that only a negligible portion of the field flux passes through this portion B of the armature winding. The armature shaft 11 not only carries the armature core, the main armature winding and the commutator, but also an auxiliary armature winding or coil shown diagrammatically at 12, this auxiliary winding being located so as to be inductively related to that portion, B, of the main armature winding which is not traversed by the magnetic field produced by the field winding 2. The auxiliary armature winding 12 may be a single loop winding or coil and its relation to the armature winding is such that it is traversed by the magnetic field produced in the portion B of the main armature winding. A single phase alternating current is induced in the auxiliary armature winding 12 and this current produces an auxiliary pulsating magnetic field which is proportional to the armature reaction flux of the generator armature.

This auxiliary magnetic field may be regarded as having two components rotating in opposite directions with respect to the armature. One of these components remains fixed in space and the other rotates at a speed twice that of the armature. At 13 I have illustrated diagrammatically a control coil or winding mounted so as to be in inductive relation to the auxiliary armature winding 12. The control coil 13 may be mounted in a fixed position with respect to the field structure of the generator and it will be understood that the rotating component of the magnetic field produced by the auxiliary armature winding 12 induces an alternating current in the control coil 13, the magnitude of which is proportional to the current induced in the auxiliary winding 12 which, in turn, is proportional to the armature reaction flux and to the current flowing in the main armature winding.

Current is supplied to the field winding 2 of the generator through field connections 14 and 15 connected to terminals of the generator field winding and to terminals of a thyratron rectifier comprising thyratron tubes 16 and 17, the secondary winding 18 of a transformer and a grid control resistance 19. The primary winding of the transformer is shown at 20, this primary field being connected to a suitable source of alternating current. It will be understood that the grid potential of the thyratron rectifier tubes determines the average value of the current supplied to the generator field winding.

As stated above, an object of this invention is to control the supply of excitation current to the generator field winding by means responsive to the internal electrical condition of the generator armature winding, specifically the armature reaction flux which is proportional to the current flowing in the welding circuit. As illustrated in the accompanying drawings, the grid potential may be controlled throughout the normal range of welding voltage by the action of the current induced in the control coil 13, this coil being connected through suitable leads 21 and 22 to an amplifier 23 which is in turn connected to a resistance element R3 through leads 24 and 25. It will be understood that the magnitude of the current flowing in the welding circuit can be varied by changing the amount of excitation current supplied to the field generator winding, and accordingly, in the apparatus illustrated in the accompanying drawings, any slight increase in the value of the current flowing in the welding circuit and in the main armature winding, produces a corresponding increase in the induced current supplied by the control coil 13 to the grid control circuit, including the grid resistance 19, the resistance element R3 and the leads 26 and 27 connected to the transformer secondary winding 18 and to the grid resistance 19. The resulting increase in the potential drop across the resistance element R3 increases the negative grid bias of the rectifier tubes 16 and 17 to delay the firing of the rectifier tubes. The current flowing through the rectifier tubes is accordingly decreased and the corresponding decrease in the excitation of the welding generator reduces the welding current supplied to the welding circuit by the generator. In this manner, the system automatically corrects any tendency of the welding current to exceed the desired value.

In like manner, any slight decrease in the welding current produces a corresponding increase in the current supplied to the generator field winding whereby the desired value of welding current is automatically restored. In this manner, the excitation control mechanism responsive to the current induced in the control coil 13 automatically maintains the welding current substantially constant throughout the normal range of welding voltage represented by that portion of the characteristic curve of Fig. 2 between the points B$h$ and B$l$. By changing the adjustment of the amplifier 23 in the excitation control circuit, the value of the welding current may be varied as desired to supply the desired normal welding current for any conditions of operation.

While it is desirable to have the welding current remain substantially constant throughout the normal range of welding voltage from approximately 15 volts to 45 volts, it is also desirable to have the welding current decrease as the welding voltage increases beyond this range, with an open circuit voltage limited to approximately 80 volts for purposes of safety. On the other hand, as the short circuit condition is approached, it is desirable to have the welding current increase as the welding voltage decreases below the normal welding range, with a short circuit current in the neighborhood of one hundred and fifty per cent (150%) to two hundred per cent (200%) of the normal welding current. Such conditions are illustrated in Fig. 2 which shows the desired drooping characteristic for ranges above and below the normal range of welding voltage.

The desired drooping characteristic for welding voltages above the normal working range can be obtained in the system described above by using a triode tube 28 responsive to voltage changes across a portion of a shunt resistance R connected in parallel with the electrode 9 and the work 10, the plate circuit of the tube 28 controlling the potential across a resistance $R_5$ in series with the control resistance $R_3$. In general, the arrangement is such that for voltages above $Bh$ in Fig. 2 the tube 28 is active to curb the supply of excitation current to the generator field winding 2. The circuit arrangement is such that as the open circuit condition is approached the voltage drop across resistance $R_5$ modifies the control action of the voltage drop across resistance $R_3$ so as to retard the firing of the rectifier tubes 16 and 17, to a greater extent than would normally occur due to the action of the amplifier 23 connected to the control coil 13.

In like manner a tube 29 connected across a portion of the shunt resistance R, may so modify the action of the regulator that increased excitation is supplied to the welding generator whenever the welding circuit voltage decreases below the value shown at $Bl$ in Fig. 2. Thus the plate circuit of the tube 29 in Fig. 1 is connected across a control resistance $R_4$ in series with the resistance $R_3$, and the tube 29 is adapted to conduct only at voltages below the value $Bl$ as illustrated in Fig. 2. Thus the voltage drop across resistance $R_4$, determined by the action of the tube 29, accelerates the firing of the rectifier tubes 16 and 17 to thereby supply more excitation to the generator field winding than would otherwise be supplied at voltages ranging between the short circuit condition and the value $Bl$ indicating the lower limit of the working range of welding voltage.

The circuits for the tubes 28 and 29 include grid batteries and the combined battery voltage and potential drop across a portion of the shunt resistance R serves to control the conduction of the tubes 28 and 29 whereby plate current flows in the circuit of the tube 28 whenever the welding voltage exceeds the value $Bh$ and plate current flows in the circuit of tube 29 whenever the welding voltage is below the value $Bl$, the plate currents of these tubes being commensurate with the magnitude of the change in the potential drop across the shunt resistance R, whereby the excitation of the generator is controlled to provide the desired drooping characteristic at voltages above and below $Bh$ and $Bl$ respectively, as illustrated in Fig. 2. Between the values $Bl$ and $Bh$ the welding current may be said to remain substantially constant because any tendency of this current to increase is immediately counteracted by a corresponding reduction in the excitation current supplied to the field winding 2 of the generator. In other words, within this normal welding range, the excitation current varies in inverse ratio to the welding current.

It will be understood that the characteristic curve of Fig. 2 represents the voltage and current conditions for one setting or adjustment of the regulator, and that by manually adjusting the amplifier 23 the regulator setting can be changed to produce other characteristic voltage-current curves each similar to the curve illustrated in Fig. 2 but displaced therefrom.

According to my improved process and apparatus it is entirely feasible to provide a voltage-current welding characteristic such that the welding current remains constant throughout the normal range of welding voltage, and the desired drooping characteristic is preserved at voltage values above and below the welding range. This provides complete automatic control of both the open circuit voltage and the short circuit current values which may be controlled independently of the current control throughout the normal range of welding voltage.

It is to be understood that my invention is not limited to the particular apparatus described above in detail but includes such modifications thereof as fall within the scope of the appended claims.

I claim:

1. A dynamo-electric machine for use in a welding apparatus comprising a main armature winding, a field winding for controlling the amount of current supplied by said machine, means for supplying excitation current to the field winding, means inductively related to the armature winding and operatively connected to the means for supplying excitation current to the field winding to cause the excitation current to change in inverse ratio to the armature current, whereby the current supplied to the load is maintained substantially constant throughout a predetermined range of voltage supplied to the load, the means inductively related to the armature winding comprising an auxiliary armature winding mounted on the armature for rotation therewith and responsive to the armature reaction flux of the machine and a stationary coil inductively related to said auxiliary armature winding.

2. A dynamo-electric machine for use in a welding apparatus comprising a main armature winding, a field winding for controlling the amount of current supplied by said machine, a source of alternating current and a thyratron rectifier connected to the field winding for supplying excitation current thereto, means inductively related to the armature winding and operatively connected to the thyratron rectifier to cause the excitation current supplied by said rectifier to change in inverse ratio to the armature current, whereby the current supplied to the load is maintained substantially constant throughout a predetermined range of voltage supplied to the load, the means inductively related to the armature winding comprising an auxiliary armature winding mounted on the armature for rotation therewith and responsive to the armature reaction flux of the machine and a stationary coil inductively related to said auxiliary armature winding.

3. A dynamo-electric machine for use in a welding apparatus comprising a main armature winding, a field winding for controlling the amount of current supplied by said machine, the main armature winding having a portion thereof disposed in a region substantially outside of the magnetic field produced by the field winding, an auxiliary winding on said armature disposed in said region thereof and inductively related to said portion of the armature winding, whereby said auxiliary winding is exclusively responsive to the armature reaction flux produced by the current in the main armature winding, means for supplying excitation current to the field winding, and means inductively related to said auxiliary armature winding and operatively connected to the means for supplying excitation current to the field winding to cause the excitation current to change in inverse ratio to the armature current, whereby the current supplied to the load is maintained substantially constant throughout a predetermined range of voltage supplied to the load.

4. A dynamo-electric machine for use in a welding apparatus comprising a main armature winding, a field winding for controlling the amount of current supplied by said machine, the main armature winding having a portion thereof disposed in a region substantially outside of the magnetic field produced by the field winding, an auxiliary winding on said armature comprising a single loop coil disposed in said region thereof and inductively related to said portion of the armature winding, whereby it produces a magnetic field proportional to the armature reaction flux produced by the current in the main armature winding, means for supplying excitation current to the field winding, and a stationary control coil inductively related to said auxiliary armature winding and operatively connected to the means for supplying excitation current to the field winding to cause the excitation current to change in inverse ratio to the armature current, whereby the current supplied to the load is maintained substantially constant throughout a predetermined range of voltage supplied to the load.

5. A dynamo-electric machine as defined in claim 3 having said portion of the main armature winding axially displaced from the area traversed by the magnetic field produced by the field winding.

6. A dynamo-electric machine as defined in claim 3 in which the means for supplying excitation current to the field winding comprises a source of alternating current and a thyratron rectifier.

7. A dynamo-electric machine as defined in claim 4 in which the means for supplying excitation current to the field winding comprises a source of alternating current and a thyratron rectifier.

JOSEPH M. TYRNER.

REFERENCES CITED

The following references are of record in the file of this patent:

UNITED STATES PATENTS

| Number | Name | Date |
|---|---|---|
| 955,171 | Kicklighter | Apr. 19, 1910 |
| 1,665,852 | Herklotz | Apr. 10, 1928 |
| 2,292,173 | Stratton | Aug. 4, 1942 |
| 2,458,658 | Tyrner | Jan. 11, 1949 |